May 12, 1970 W. W. QUIGLEY 3,511,942

TELEPHONE MOUNTING ASSEMBLY

Filed Jan. 3, 1967 2 Sheets-Sheet 1

INVENTOR
WARREN W. QUIGLEY

BY Browne, Schuyler & Beveridge

ATTORNEYS

INVENTOR

WARREN W. QUIGLEY

BY Browne, Schuyler & Beveridge

ATTORNEYS

United States Patent Office 3,511,942
Patented May 12, 1970

3,511,942
TELEPHONE MOUNTING ASSEMBLY

Warren W. Quigley, Forest Park, Ga., assignor to Gladwin Industries, Inc., a corporation of Georgia Filed Jan. 3, 1967, Ser. No. 606,727
Int. Cl. H04m *1/11*
U.S. Cl. 179—146 22 Claims

ABSTRACT OF THE DISCLOSURE

An assembly for mounting a panel telephone to a wall comprising a primary mounting device which is secured to the wall, an enclosure having an aperture received about the primary mounting device with the back of the enclosure engaged against the wall, and an adapter received in the enclosure and secured to the back thereof for receiving the panel telephone which is secured to the primary mounting device as well as to side walls of the adapter.

This invention relates to the mounting of telephones particularly those having a planar or panel face which is mounted flush with a wall or face of an associated enclosure. Such telephones have been referred to in the industry as "panel telephones."

One of the objects of the present invention is to provide a new and improved mounting assembly for a panel telephone or the like which effectively supports the telephone in the desired position and which is relatively simple to install while also being secure against unauthorized removal or tampering.

Another object of the present invention is to provide such a telephone mounting assembly which may incorporate a telephone enclosure that is mounted against a primary support wall or similar structure and with the front panel of the telephone coinciding with the front of the enclosure. Included herein is the provision of a novel adapter included in the mounting assembly for securing and positioning the telephone in the enclosure.

A further object of the present invention is to provide a novel mounting device included in the telephone mounting assembly for securely anchoring the assembly with respect to a primary support wall or similar structure.

A still further object of the present invention is to provide such a telephone mounting assembly whose component parts may be relatively economically manufactured for use with new or other panel telephones currently in use.

Other objects and advantages of the present invention will become apparent from the following detailed description in conjunction with the accompanying drawings in which.

Figure 1:
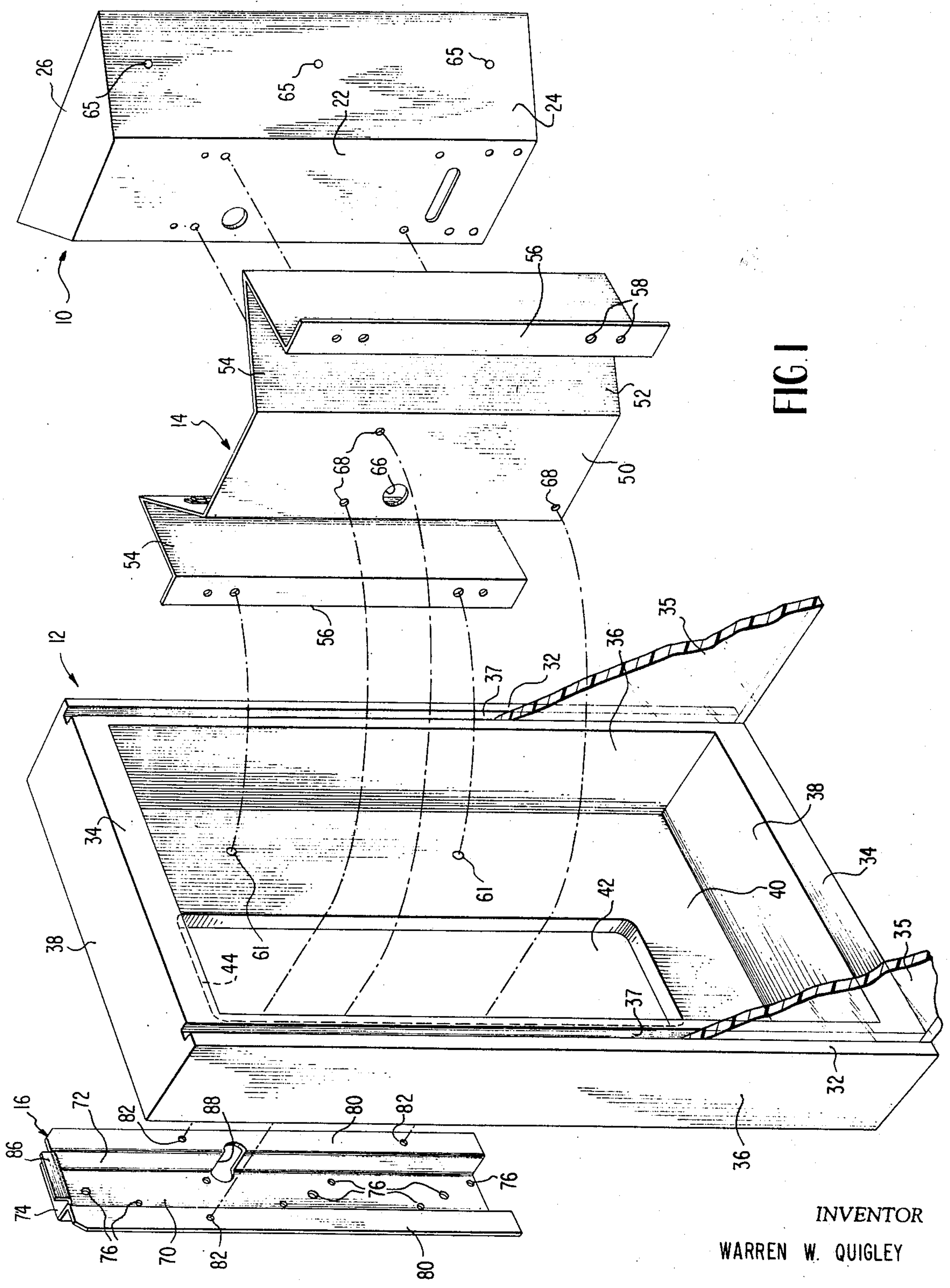
FIG. 1 is an exploded perspective view of a telephone mounting assembly embodying the present invention.

Referring to the drawings in detail and for purposes of illustration only, there is shown a telephone mounting assembly embodying the present invention and including a panel telephone generally designated 10, an associated enclosure 12, an adapter 14 for mounting the telephone in the enclosure, and a mounting device 16 for securing telephone 10 with respect to a permanent or primary support wall or similar structure 18. In the shown embodiment telephone 10 is of the type having a flat or planar front face 20, a planar rear face 22 parallel to front face

20, planar sidewalls 24 extending inwardly at an acute angle from front face 20 to rear face 22 and upper and lower end walls 26. All of the telephone walls just described are rectangular except the endwalls 26 which have a trapezoidal outline. The telephone dial (not shown) is mounted in front face 20 so as to be exposed for use and similarly the cradle 28 which supports the handset 30 projects through an aperture in front wall 20.

Adapter 14 is employed to position and secure telephone 10 in enclosure 12 and in the preferred embodiment shown in the drawings, includes a rectangular base 50 and a pair of opposite rectangular sidewalls 52 projecting outwardly from the base at an obtuse angle of 135° so that the base and sidewalls of the adapter conform to the corresponding portions 22 and 24 of the telephone. Additionally, adapter 14 includes a pair of rectangular connecting walls 54 extending at 45° from the outer edges of the adapter sidewalls 52 and rearwardly toward the plane of the adapter base 50.

Projecting perpendicularly from the rear ends of connecting walls 54 are a pair of flanges 56 which have apertures 58 for receiving fasteners 60 to secure the adapter to backwall 40 of the enclosure. In the preferred embodiment, adapter 14 is integrally made from 16 gage sheet steel. Moreover in one actual embodiment, the longitudinal dimension of the planar walls 50, 52, 54, 56 is about 15¼ inches while the overall width or transverse dimension of the adapter is about 15¾ inches. Additionally, the depth of the adapter such as may be measured by the width of the connecting walls 54, is about 4³⁄₁₆ inches; while flanges 56 have a width of approximately 1¼ inches.

Figures 2, 3, 4:
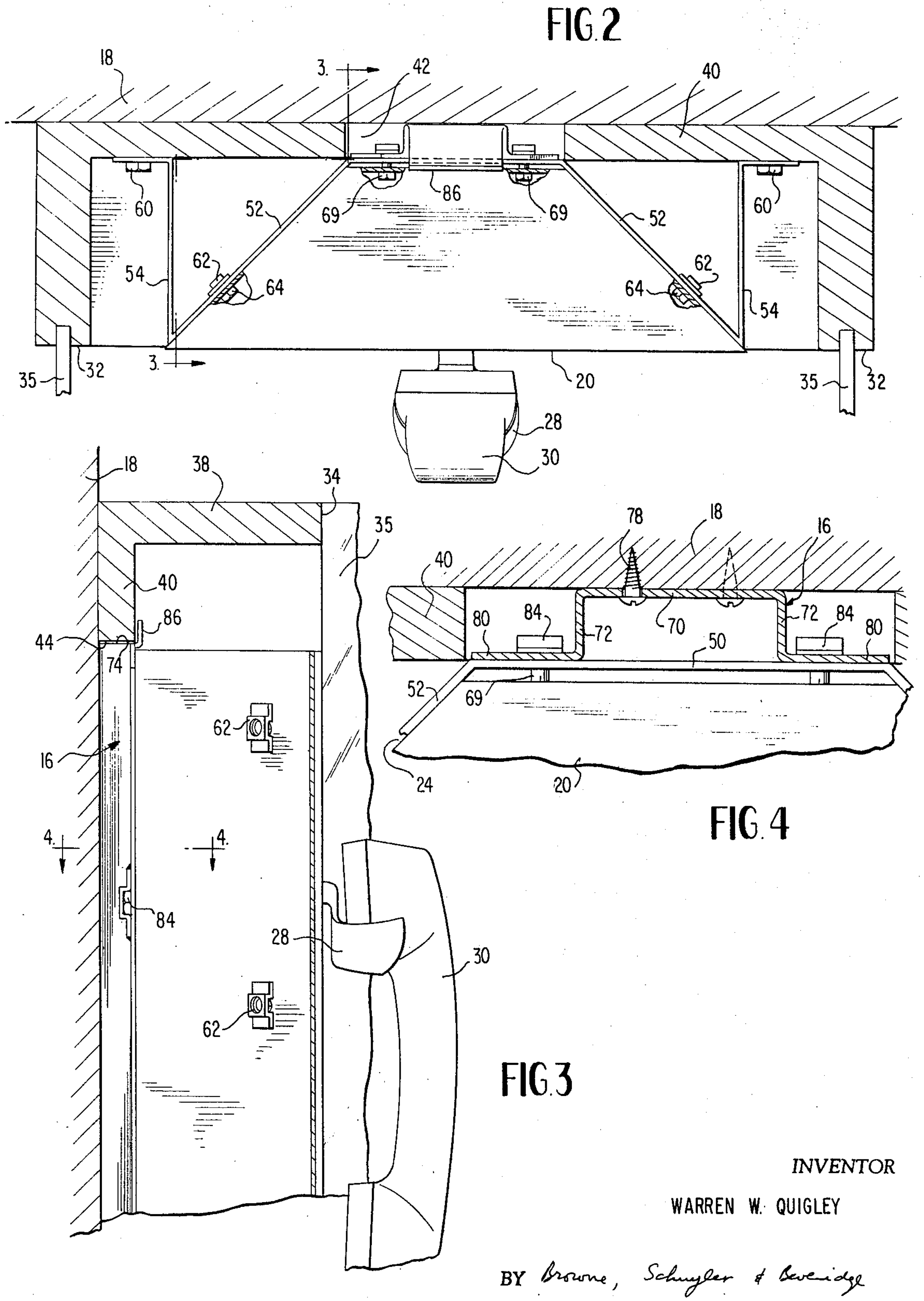
FIG. 2 is an enlarged, transverse cross-sectional view of a fully installed telephone assembly with certain parts broken away to show construction.
FIG. 3 is an enlarged, fragmental, cross-sectional view taken generally along lines 3—3 of FIG. 2.
FIG. 4 is an enlarged, fragmental, cross-sectional view taken generally along lines 4—4 of FIG. 3.

When mounted to enclosure 12, adapter base 50 and sidewalls 52 define a space for receiving telephone 10 as shown in FIG. 2. In addition to securement to mounting device 16 as will be described, telephone 10 is also secured to the adapter. This is effected by nuts 62 secured in any suitable manner to the rear faces of sidewalls 52 of the adapter behid corresponding apertures formed in the sidewalls. Threaded fasteners or screws 64 directed from within the telephone are received in nuts 62 to effect securement of the telephone to the adapter. In the illustrated adapter, each sidewall 52 is equipped with three nuts 62 for respective cooperation with an equal number of screws 64 which project from apertures 65 in the telephone sidewalls.

To accommodate the telephone wires (not shown) base 50 of the adapter has an enlarged aperture 66 which is dimensioned to pass the telephone wires therethrough and into mounting device 16. Additionally base 50 of the adapter is provided with one or more apertures 68 shown as three in number, for receiving fasteners 69 which secure the telephone directly to mounting device 16.

Mounting device 16 provides the primary mounting of the assembly to the wall 18. In the illustrative embodiment, mounting device 16 has a generally boxlike shape including a planar rectangular base 70, a pair of opposite, rectangular, sidewalls 72 projecting perpendicularly from the base and an upper top endwall 74 also projecting perpendicularly from the base between the sidewalls. For attaching the mounting device to wall 18, a number of apertures 76 are formed in base 70 to receive screws 78 or other threaded fasteners.

Telephone 10 is secured with respect to mounting device 16 by means of side flanges 80 which are shown as being elongated and rectangular and projected outwardly from sidewalls 72 in perpendicular relationship with the latter. Flanges 80 have a number of apertures 82, the total number of which is illustrated as three, behind which are fixed to the flanges, nuts 84 for receiving the threaded fasteners 69 which project from the rear wall 22 of the telephone and then through adapter plate aperture 68, and opening 42 in the enclosure backwall 40. In the shown embodiment, two nuts 84 are provided, at upper portions of flanges 80 respectively and one nut 84 at a lower portion of the right hand flange 80.

During installation as will be described, the enclosure backwall 40 is placed against wall 18 with the mounting device 16 received through opening 42 and also with the upper edge 44 of opening 42 resting on endwall 74 of the mounting device. To retain the upper edge 44 of enclosure aperture 42 on endwall 74 of the mounting device, a projecting flange 86 is formed on endwall 74 to project perpendicularly outwardly. Thus during installation, the upper edge 44 of enclosure aperture 42 is slipped over flange 86.

To accommodate the telephone wires which pass through aperture 66 in the adapter base an internal depression 88 is formed in the right hand side wall 72 of the mounting device as shown in FIG. 1. From depression 88, the wires lead downwardly through the interior of mounting device 16 and project beyond the lower end of the latter which is open for that purpose.

As with the adapter, mounting device 16 is preferably integrally formed from 12 gage sheet steel. In one embodiment, the mounting device has an overall length of about 19½ inches, an overall width of about 4½ inches, and a depth of approximately ¾ inch. Additionally flanges 80 are about 1⅛ inches wide and flange 86 about ½ inch.

To install the mounting assembly, mounting plate 16 is secured to primary support wall 18 by screws 78 passing through apertures 76 in base 72 of the mounting plate and into primary support wall 18. Enclosure 12 is then placed on wall 18 by hooking the upper edge 44 of opening 42 over the flange 86 so that the aperture edge rests on mounting plate wall 74.

Adapter 14 is then secured to the enclosure by screws 60, passing through apertures 58 in adapter 56 and into backwall 40 of the enclosure. Additionally, one or more screws 60 may also project through apertures 61 in the enclosure backwall and into primary support wall 18 to provide additional security.

Telephone 10 may then be secured with respect to adapter 14 by screws 64 which project from the telephone and into nuts 62 on the adapter sidewalls 52. To effect this securement, the telephone has a front door (not shown) which is opened to provide access for installing screws 64. This securement of the telephone with respect to the adapter also serves to align apertures 68 in adapter base 50 with the corresponding apertures 82 in the mounting plate flanges 80. Screws 69 are then advanced through adapter apertures 68, opening 42, flange apertures 82 and finally nuts 84 on flanges 80 of the mounting plate.

If desired the enclosure may be provided with front facing strips 35 which are installed in longitudinal grooves 37 formed in the edges 32 of the enclosure sidewalls 36 to complete the assembly.

Modifications and adaptations of the present invention readily apparent from the foregoing description and associated drawings, altthough not specifically mentioned herein, will nevertheless be included within the scope of the present invention as indicated in the appended claims.

I claim:

1. A telephone mounting assembly for use in mounting a panel telephone or the like with respect to a primary support wall or the like, the assembly comprising in combination; a mounting device adapted to be attached to a primary support wall or the like and having means for fastening a telephone thereto, a telephone enclosure including a back wall having a cut-out aperture dimensioned to be received about the mounting device with the back wall adapted to be attached to the primary support wall, and an adapter having means for being attached to the back wall and means for positioning the telephone in a predetermined position in the enclosure.

2. The telephone mounting assembly defined in claim 1 wherein said adapter includes a base, a pair of opposite side walls projecting at an angle from the base and flange means dimensioned to be fixed against the back wall of the enclosure, said base and sidewalls of the adapter being dimensioned to receive and accommodate the backwall and sides of a telephone.

3. The telephone mounting assembly defined in claim 2 wherein said adapter sidewalls project outwardly from the adapter base at an obtuse angle, wherein said flange means includes a pair of oppositely located flanges, and wherein said adapter further includes a pair of connecting walls respectively interconnecting said flanges and the sidewalls of the adapter, said connecting walls extending from the adapter sidewalls and towards the plane of the adapter base.

4. The telephone mounting assembly defined in claim 3 wherein said adapter is integrally formed from sheet material.

5. The telephone mounting assembly defined in claim 2 wherein said adapter base has a number of apertures for receiving fasteners adapted to secure the telephone to the mounting device and wherein said adapter sidewalls have a number of fastening means for fastening sidewalls of a telephone to the sidewalls of the adapter.

6. The telephone mounting assembly defined in claim 5 wherein said fastening means in the adapter sidewalls include floating nuts adapted to receive threaded fasteners or the like and wherein the adapter further includes a number of apertures formed in said flange means thereof for receiving fasteners to secure the adapter to the backwall of the enclosure.

7. The telephone mounting assembly defined in claim 1 wherein said mounting device has a generally boxlike shape including a base having apertures for receiving fasteners for attaching the mounting device to primary support wall or the like, said mounting device having a pair of flanges projecting outwardly on opposite sides thereof, said flanges having means for securing a telephone thereto.

8. The telephone mounting assembly defined in claim 7 wherein said means in said flanges includes a number of floating nuts for receiving fasteners to connect a telephone thereto.

9. The telephone mounting assembly defined in claim 7 wherein said mounting device has a pair of opposite sidewalls with said flanges projecting outwardly from said sidewalls respectively and further having an end wall adapted to receive the upper edge of said aperture in the backwall of the enclosure, said end wall of said mounting device having an outwardly projecting flange.

10. The telephone mounting assembly defined in claim 9 wherein said adapter has an aperture dimensioned to receive wires from the telephone and wherein said mounting device has an internal depression in one of the sidewalls thereof positioned to be aligned behind said aperture in said adapter for accommodating the telephone wires.

11. The telephone mounting assembly defined in claim 2 wherein said enclosure has a pair of opposite sidewalls projecting from the backwall and terminating in the front plane of the enclosure and wherein said adapter sidewalls are dimensioned to position the front panel of a telephone generally at the front plane of the enclosure.

12. An adapter for mounting a panel telephone or the like with respect to an enclosure which has a backwall; the adapter comprising a base, a pair of sidewalls projecting at an angle from the base, said base and sidewalls dimensioned to accommodate side and rear portions of a telephone to be mounted thereby, a pair of oppositely located flanges dimensioned to be fastened to the backwall of an enclosure for securing the adapter thereto, and opposite connecting walls interconnecting the outer edges of said adapter sidewalls and said flanges.

13. The adapter defined in claim 12 wherein said sidewalls have means for fastening the sidewalls of a telephone thereto.

14. The adapter defined in claim 13 wherein said fastening means includes a number of floating nuts for receiving threaded fasteners.

15. The adapter defined in claim 14 further including a number of apertures through the base thereof dimensioned to receive fasteners from a telephone to secure the telephone to a mounting device behind the adapter, said adapter base has another aperture dimensioned to receive wires from the telephone, and wherein said flanges have a number of apertures for receiving fasteners for fixing the adapter to a backwall of an enclosure.

16. The adapter as defined in claim 12 wherein said sidewalls project from the base outwardly at obtuse angles and wherein said connecting walls project from the sidewalls toward the plane of said base to the flanges.

17. The adapter as defined in claim 16 wherein said connecting walls are generally parallel to each other and extend perpendicular with respect to said flanges and also with respect to the plane of the adapter base.

18. The adapter as defined in claim 17 wherein said base, sidewalls, connecting walls and flanges each have generally rectangular shapes and wherein said adapter has an integral construction formed from sheet material.

19. A mounting device for securing a public telephone or the like with respect to a primary support wall or the like; the mounting device comprising an elongated base having opposite sidewalls projecting from the base and an end wall projecting from the base between said sidewalls, a pair of side flanges projecting outwardly from the sidewalls adapted to receive fasteners for securing a telephone thereto, said base having a number of apertures for receiving fasteners for securing the mounting device with respect to a primary support wall, a retaining flange projecting outwardly from said end wall, said end wall being dimensioned to support a backwall of an enclosure with said retaining flange serving to locate and retain the enclosure back wall on said end wall.

20. A mounting device defined in claim 19 wherein said side flanges have a plurality of floating nuts dimensioned to receive threaded fasteners for securing a telephone thereto.

21. The mounting device defined in claim 20 wherein said side and end walls project from the base generally at right angles and wherein said flanges project from the side and end walls generally at right angles.

22. The mounting device defined in claim 21 wherein said base, sidewalls and side flanges each have rectangular shapes and wherein said mounting device is integrally formed from sheet material.

References Cited

UNITED STATES PATENTS

| | | | |
|---|---|---|---|
| 3,338,002 | 8/1967 | Ericsson et al. ---- | 179—183 X |
| 3,445,969 | 5/1969 | Sherron -------------- | 52—28 |

WILLIAM C. COOPER, Primary Examiner

U.S. Cl. X.R.

52—28